United States Patent [19]
Chin

[11] Patent Number: 5,915,102
[45] Date of Patent: Jun. 22, 1999

[54] COMMON ARBITER INTERFACE DEVICE WITH ARBITRATION CONFIGURATION FOR CENTRALIZED COMMON BUS ARBITRATION

[75] Inventor: Henry Chin, Wappingers Falls, N.Y.

[73] Assignee: International Business Machines Corporation, Armonk, N.Y.

[21] Appl. No.: 08/744,813

[22] Filed: Nov. 6, 1996

[51] Int. Cl.⁶ .......................... G06F 13/36; G06F 13/366
[52] U.S. Cl. ............................................ 395/293; 395/308
[58] Field of Search ..................................... 395/293, 280, 395/285, 284, 289, 306, 309, 287, 500

[56] References Cited

U.S. PATENT DOCUMENTS

| | | |
|---|---|---|
| 4,727,477 | 2/1988 | Gavril . |
| 4,779,089 | 10/1988 | Theus . |
| 4,787,033 | 11/1988 | Bomba et al. . |
| 4,837,682 | 6/1989 | Culler ...................................... 395/287 |
| 5,111,423 | 5/1992 | Kopec, Jr. et al. . |
| 5,148,545 | 9/1992 | Herbst et al. . |
| 5,307,466 | 4/1994 | Chang ..................................... 395/325 |
| 5,377,331 | 12/1994 | Drerup et al. . |
| 5,404,462 | 4/1995 | Datwyler et al. ....................... 395/500 |
| 5,408,129 | 4/1995 | Farmwald et al. . |
| 5,420,985 | 5/1995 | Cantrell et al. ......................... 395/325 |
| 5,430,848 | 7/1995 | Waggener ............................... 395/325 |
| 5,475,850 | 12/1995 | Kahn ...................................... 395/290 |
| 5,506,972 | 4/1996 | Heath et al. ............................ 395/293 |
| 5,515,516 | 5/1996 | Fisch et al. ............................. 395/293 |
| 5,519,883 | 5/1996 | White et al. ............................ 395/500 |
| 5,581,782 | 12/1996 | Sarangdhar et al. ................... 395/288 |
| 5,592,631 | 1/1997 | Kelly et al. ............................. 395/293 |

OTHER PUBLICATIONS

"Configuration of a Single Point Bus Arbitration Scheme Using On–Chip Arbiters" H. Chin, IBM Docket No. PO996005, Serial No. 08/744,812.

*Primary Examiner*—Ayaz R. Sheikh
*Assistant Examiner*—Xuong M. Chung-Trans
*Attorney, Agent, or Firm*—Marc A. Ehrlich

[57] ABSTRACT

A method and apparatus for configuring a centralized arbitration scheme for a commonly accessed communication bus using arbiter devices with arbitration control circuitry included therein. The arbiter devices, each of which is associated with a separate bus master device, include arbitration control circuitry and are coupled to an arbitration control bus over which signals for arbitrating control to the commonly accessed communications bus are provided. During a configuration mode of operation, the same arbiter device connections to the arbitration control bus provide signals which are decoded via arbitration configuration circuitry on each device to provide a configuration status indicating whether other devices requiring arbitration are connected to the arbitration control bus and whether the arbitration control circuitry included on the particular device will be enabled to perform the required arbitration. Moreover, the arbiter devices may include protocol translation logic for permitting the interconnection of bus master devices having different arbitration protocols than the protocol required for accessing the common bus.

53 Claims, 5 Drawing Sheets

COMMON ARBITER INTERFACE DEVICE WITH ARBITRATION CONFIGURATION FOR CENTRALIZED COMMON BUS ARBITRATION

CROSS REFERENCE TO RELATED APPLICATION

This application for Letters Patent is related, and cross reference may be had to the U.S. Patent Application entitled "Configuration of A Single Point Bus Arbitration Scheme Using On-Chip Arbiters" by Henry Chin et al., which has been assigned attorney docket number PO996005 and is filed concurrently herewith.

FIELD OF THE INVENTION

The present invention relates to the field of data bus arbitration, and particularly to centralized common bus arbitration systems designed using multiple bus master devices which may include different arbitration protocols each connected through arbitration interface devices having built-in arbitration control circuitry to the common bus, whereby each bus master device may control the commonly accessed bus.

BACKGROUND OF THE INVENTION

In modern computer system design it is common for multiple devices to be coupled to a common communication bus. Moreover, it is also common for more than one of these devices to possess the capability to act as a bus master which controls the transfer of data, control and address signals between itself and another device over the common communication bus. In such computer systems it is therefore necessary to implement an arbitration scheme to determine the order in which these multiple bus master devices may control the common bus. The arbitration scheme is utilized during situations in which two or more of the bus master devices simultaneously seek to control the common bus.

The arbitration scheme may be viewed as a component of the bus protocol. The bus protocol is a complex set of pre-defined rules which govern the use of the common communication bus. Generally, a bus protocol can be viewed as a set of rules which allow different devices to communicate over a common bus without interfering with one another. In a multiple bus master system it is necessary to ensure that each device that attaches to the common communication bus, obeys the arbitration scheme of the common bus, so as to enable each of these devices to individually access or control the common bus devices and to prevent contention therebetween. In most computer system designs, bus master devices having a common arbitration scheme which is identical to, or at least compatible with the arbitration scheme defined by the protocol of the common communication bus are utilized. However, in certain instances, it is necessary to utilize a particular bus master device which is not readily available with the arbitration control scheme used to access the common bus. In such instances, the designer may be forced to undertake a costly customization to design a version of the required bus master having the desired arbitration scheme. The cost effective alternative to such a design effort would be to use a separate arbiter device to perform an arbitration protocol conversion, thereby efficiently rendering the requisite bus master device compatible with the common communication bus arbitration protocol. In this manner a designer may implement a computer system design using "off-the-shelf" components, thereby facilitating expeditious design and reducing the cost associated with the system.

Arbitration schemes for controlling a common communication bus may be broadly classified as either distributed arbitration schemes in which arbitration devices (or arbiters) associated with the bus master devices all participate in the arbitration operation, or centralized (i.e. single-point) arbitration schemes in which a single centralized arbiter is active to allocate access and control of the common communication bus among conflicting bus master devices requesting such access and/or control.

In distributed arbitration schemes, each of the multiple bus master devices is typically assigned a priority which reflects the sequence in which each of the multiple bus master devices may control the bus. A bus master device having a high priority will take precedence over a bus master device having a low priority when each of the devices simultaneously requests control of the common bus. Priority may be determined by the position at which a particular bus master device attaches to the common bus. In the distributed arbitration scheme described in U.S. Pat. No. 5,408,129 to Farmwald et al. (issued Apr. 18, 1995), each device on the bus is assigned a unique device ID number. When a collision between bushmaster requests to control the common bus occurs, each bus master device seeking to control the bus drives a single BusData line during a single bus cycle corresponding to its assigned master ID number, and a fixed priority scheme is implemented to sequence the requests in a bus arbitration queue maintained by at least one device. Further bus master requests are disabled until the queue is cleared.

Distributed arbitration designs are not the optimum means for performing bus arbitration in every system utilizing a commonly accessed bus. Typically the distributed arbitration design is inflexible and it is difficult to affect a modification in priority assignments. Moreover, priority assignments may lead to the "starvation" of a lower priority device. Consequently, such prioritization schemes mandate a classification of the operations to be performed by each of the bus masters, to ensure that low priority devices, which control the bus less frequently than high priority devices, are not responsible for performing the most important operations over the common data bus. Furthermore, in priority schemes such as the scheme disclosed in the patent to Farmwald et al., bus cycles are devoted to the resolution of conflicting bus master requests thereby reducing the bandwidth of the common bus. Finally, depending upon the distributed arbitration scheme that is implemented, the number of bus master devices that may be arbitrated thereby may be limited.

Accordingly, certain designs for systems implementing a commonly accessed bus system dictate the implementation of the aforementioned single point arbitration scheme. Systems including a commonly accessed bus in which the arbitration is centrally performed by a single arbitration control circuit often include a separate arbitration device associated with each bus master device. In such systems, one of these arbitration devices is typically activated to provide the centralized arbitration operation, while the other arbiters serve as slave arbiters thereto. For example, U.S. Pat. No. 5,377,331 entitled "Converting A Central Arbiter To A Slave Arbiter For Interconnected Systems" issued Dec. 27, 1994 to Drerup et al. and assigned to International Business Machines Corporation (hereinafter "IBM", IBM is the assignee of the present application as well) teaches a system which enables the connection of plural subsystems each comprising a local bus arbiter for arbitrating device requests for devices within the subsystems, to a common Micro Channel bus (Micro Channel is a trademark of IBM Corporation) by providing conversion logic devices which effectively transform the local arbiters on the corresponding subsystems into slave arbiters. In the patent, the single subsystem (illustratively termed the host system) which is responsible for arbitrating the common bus is not provided with a conversion logic device. The conversion logic includes two requesting arbiters, one of which arbitrates control of the internal subsystem bus and the other, which arbitrates for control of the common Micro Channel bus. Once a conversion logic device obtains control of the common Micro Channel bus, it relinquishes control of the internal subsystem bus, and an arbitration cycle is initiated, after which the subsystem device with the highest priority obtains control of the internal subsystem bus and is capable of passing commands and/or data through the conversion logic device to other devices in other subsystems coupled to the common Micro Channel bus. Since Drerup et al. require arbitration of the common Micro Channel bus, it follows that the bandwidth of that common bus is reduced. Additionally, as a result of the successive stages of arbitration that characterize the Drerup et al. invention, extra arbitration cycles are required for access to the common Micro Channel bus. However, Drerup et al. do teach an implementation of centralized arbitration by separate bus master devices each including an arbiter circuit.

In other single point or centralized bus arbitration systems, the activated arbiter logic is enabled via an activation signal on an arbitration bus. Such systems are typically implemented by providing additional I/O on each of the arbitration devices associated with each bus master device. The additional I/O serves to enable an arbitration control circuit associated with a single bus master device, while disabling each of the arbitration control circuits on the other bus master devices. However, such an implementation adds I/O to each of the arbitration devices, thereby rendering the arbitration bus more complex and costly.

It is therefore desirable to provide a means for providing centralized bus arbitration while providing protocol conversion logic which solves the aforementioned design problems associated with incompatible bus master devices. Furthermore, it is desirable to provide such a solution which does not require additional I/O or arbitration cycles, and is inexpensive, simple to implement and flexible so as to promote the design of lower cost computing systems.

SUMMARY OF THE INVENTION

The foregoing problems and the shortcomings of the prior art are overcome and additional advantages are provided by the present invention in which an apparatus and method for configuring a centralized bus arbitration scheme utilizing an arbiter device in a packaged integrated circuit component (i.e. an arbiter chip) including arbitration control and arbitration protocol translation circuitry is taught.

In an embodiment of the invention, a bus master device which includes bus device logic for controlling a communication bus may be coupled to a commonly accessed communication bus and access thereto is arbitrated through a coupled arbiter device. The commonly accessed bus, may carry address, data and control signals. The arbiter device comprises arbitration control logic for resolving conflicting requests from other arbiter devices for control of the common bus. The devices which will arbitrate for control of the common bus, including the arbiter device or bus master devices, are coupled to each other via an arbitration control bus, over which these devices transmit and receive signals permitting an activated one of the arbiter devices to arbitrate access and/or control of the common bus.

The arbiter device additionally comprises arbitration configuration logic which decodes signals received over the same I/O for the arbitration control bus to provide configuration status signals to the arbitration control logic indicating whether the particular arbiter device is to be the activated arbiter device which performs arbitration of the common bus or whether it is to act as a slave arbiter device which seeks control of the common bus, through the active arbiter device, for its corresponding bus master device.

To enable the connection of bus master devices having arbitration schemes which differ from the arbitration scheme required to access to the common bus, the arbiter device further includes arbitration protocol translation logic. The arbitration protocol translation logic in the arbiter device receives the arbitration control signals from its corresponding bus master device, having an arbitration protocol different from that required for the common bus, and translates the bus master device arbitration control signals into arbitration control signals which are compatible with the arbitration protocol for the common bus.

Accordingly, the present invention provides arbitration for multiple bus master devices to a common communication bus while enabling the use of bus master devices having arbitration protocols which differ from other such bus master devices as well as from the arbitration protocol required for the common communication bus.

Additional features and advantages are realized through the mechanisms of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed at the conclusion of the specification. The foregoing and other features and advantages of the invention will be apparent from the following detailed description in conjunction with the accompanying drawings, in which:

DETAILED DESCRIPTION OF THE PREFERRED EMBODIMENTS OF THE INVENTION

In accordance with the principles of the invention, a method and apparatus for configuring a centralized bus arbitration scheme for controlling a commonly accessed communication bus using a commonly designed arbiter device including bus arbitration protocol conversion logic as well as arbitration control logic is disclosed. As will become apparent from the subsequent disclosure, a number of such arbiter devices, each coupled to, and in communication with a corresponding bus master device may be utilized to ensure that a desired bus control protocol is implemented for the commonly accessed bus.

To permit centralized (or single point) arbitration control of a commonly accessed bus without requiring additional I/O on the arbiter devices or diminishing the bandwidth of the common bus, each of the arbiter devices including the arbitration control logic, further includes means for coupling to an arbitration control bus to provide and receive arbitration control signals thereover. The arbitration control logic included on a designated arbiter device, having an activated arbitration control logic circuit, utilizes these signals to arbitrate access and/or control of the common bus among each bus master device which may be associated with a corresponding arbiter device.

Each arbiter device further includes arbitration configuration circuitry. The arbitration configuration circuitry utilizes arbitration configuration signals received from the arbitration control bus via the same inputs that are used by the arbitration control circuit for receiving arbitration control signals. The arbiter devices exhibit a configuration mode of operation during which each arbiter device determines its corresponding active/inactive arbitration status. During the configuration mode of operation, the arbitration configuration signals are decoded by the arbitration configuration circuitry to determine, for each of the arbiter devices, whether other such devices, including other arbiter devices or bus master devices, are coupled to the arbitration control bus, necessitating arbitration to the common bus, and whether the arbitration control circuitry included in the particular arbiter device is to perform the arbitration of the commonly accessed bus (i.e. whether that arbiter device is the "active" arbiter).

Moreover, the arbiter device includes a bus arbitration protocol translation logic circuit which is employed in instances where the arbitration protocol of the corresponding bus master device is not compatible with the arbitration protocol of the arbitration control bus. The bus arbitration protocol conversion logic circuit receives as input, an arbitration control signal from the corresponding bus master device which is seeking to control or access the common bus. Through the bus arbitration protocol conversion logic circuit these arbitration signals are reconfigured into signals which are compatible with the arbitration protocol of the arbitration control bus.

Figure 1:
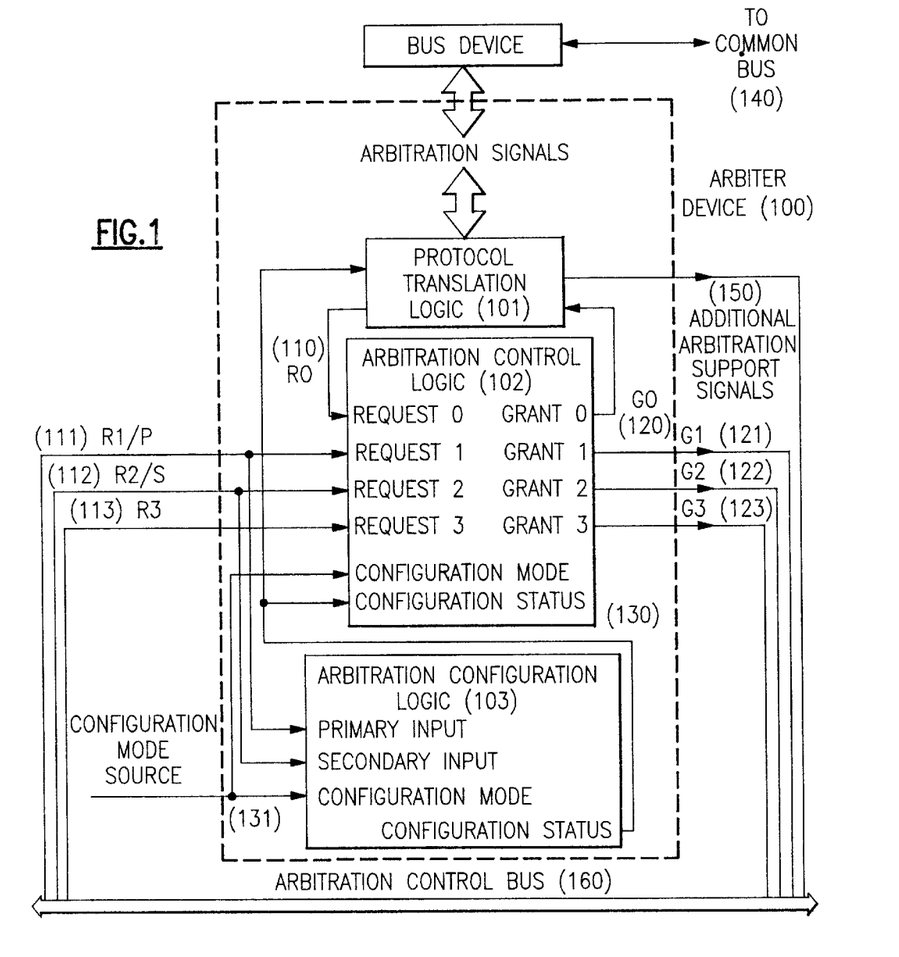
FIG. 1 depicts an exemplary arbiter device including arbitration control logic, arbitration configuration logic and arbitration protocol translation logic.

Turning now to our invention in greater detail, reference may be had to FIG. 1 which depicts an exemplary arbiter device (100) generally designed in accordance with the principles of the present invention. In a preferred embodiment of the invention, the arbiter device (100) is an integrated circuit component including circuitry on a semiconductor carrier incorporated into a component package (i.e. a semiconductor chip). The arbiter chip may, in a preferred embodiment of the invention, include programmable logic circuitry and as such may take the form of a programmable array logic (PAL), a field programmable gate array (FPGA), or an application specific integrated circuit (ASIC). The programmable nature of these devices will enable a designer to affect real-time changes to the protocol conversion logic for the arbiter device, to accommodate various bus master devices having any known type of bus protocol. The bus master device which connects to the arbiter chip may function as any one of a variety of components such as a processor, a direct memory access controller (DMA), a memory management unit (MMU), or any other analog or digital component which may transmit and receive signals over a common bus.

The arbiter device (100) includes protocol translation logic (101) which enables the arbiter device to serve as an interface or translator between its connected bus master device and the arbitration control bus (160). The arbiter device (100) additionally includes an arbitration control circuit (102) which is coupled to the arbitration protocol translation logic circuit (101) via request line R0 (110) and grant line G0 (120). The arbitration control circuit (102) can be instructed to perform arbitration for control of the common bus (140) via receipt of configuration status signals (130) from an arbitration configuration circuit (103), over configuration status lines (130) which are coupled to the arbitration control logic as well as to the protocol translation logic (101). When the arbitration control circuit (102) is so instructed, it arbitrates control of the common bus among conflicting requests from multiple bus master devices. The arbitration control circuit (102) additionally includes a configuration mode input (131) for determining when the device is operating in a configuration mode, during which the operational state (i.e whether the arbiter device is to be the "active" arbiter performing the common bus arbitration) of the device is ascertained. A detailed explanation of the configuration mode operation of the arbiter device will be subsequently provided.

The arbitration control circuit (102) controls access to the common bus (140) via the communication of arbitration control signals over the arbitration control bus (160) and any other required additional arbitration support signals (150) between multiple bus master devices which may be coupled or coupled through other arbiter devices to the arbitration control bus (160). When an arbitration control circuit (102) has been activated to arbitrate control of the common bus (140), it does so by receiving request signals from the other bus master devices or through their respective arbiter devices, and transmitting grant response signals back to these bus master devices or arbiter devices over a commonly accessed arbitration control bus (160). Request signals are received via the exemplary request signal connections R1/P (111), R2/S (112), R3 (113) to the arbitration control bus (160) and grant responses are transmitted via the exemplary grant signal connections G1 (121), G2 (122) and G3 (123) to the arbitration control bus (160). Additionally, the arbitration control circuit (102) receives requests for control of the common bus (140) and issues grant responses to its associated bus master device via the Request 0 (110) and Grant 0 (120) lines respectively of the protocol translation logic circuit (101).

The illustration in FIG. 1 depicts an arbiter device (100) with an arbitration control circuit (102) having three external request inputs and three external grant outputs, however it will be understood by those skilled in the relevant art that any number of arbitration control lines comprising the arbitration control bus (160) may be coupled to the arbitration control circuit. The number of such arbitration control lines depends upon the number of bus master devices and associated arbiter devices coupled to the common bus (140) which may require arbitration. In a preferred embodiment of the invention, the connections to the arbitration control bus may be pins extending from the arbiter device package thereby readily enabling connection to a commonly accessed arbitration control bus (160).

Figure 3:
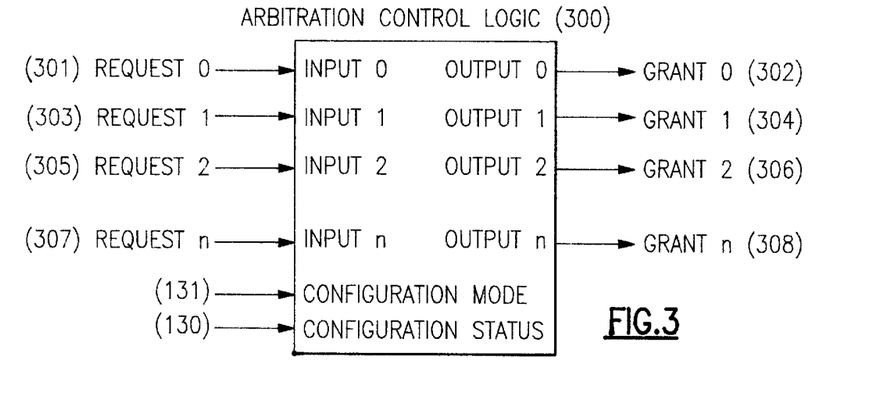
FIG. 3 depicts a block diagram of an exemplary arbitration control logic circuit utilized in the arbiter device.

An illustrative arbitration control circuit (300) is shown in greater detail in FIG. 3. In an exemplary embodiment of the invention, arbitration control at the arbitration control circuit (300) is based upon a request-grant protocol which is compatible with the protocol of the arbitration control bus (160). The arbitration control circuitry (300) includes request-grant pairs illustrated as Request 0 (301) pairing with Grant 0 (302), Request 1 (303) pairing with Grant 1 (304) and so on up to Request n (307) pairing with Grant n (308), wherein the request lines represent inputs to the arbitration control circuit (300), receiving signals from the arbitration control bus (160), and the grant lines represent outputs therefrom, driving signals on to the arbitration control bus (160). The request and grant pairs illustrated in FIG. 3 relate to the request and grant lines in FIG. 1 as follows: input R0 (110) pairs with output G0 (120), input R1/P (111) pairs with output G1 (121), input R2/S (112) pairs with output G2 (122), and input R3 (113) pairs with output G3 (123).

The arbitration control circuit (102) may be activated to perform arbitration of the common bus (140) via receipt of the configuration status signal (130). An enabled or activated arbitration control circuit (102) included in arbiter device (100) would arbitrate access to the common bus (140) as follows: A bus master device requiring arbitration onto the common bus would be coupled either directly or through an associated arbiter device to the arbiter device containing activated arbitration control circuit (102) over the arbitration control bus (160) via one of the request-grant pairs of I/O, for example R1/P (111) and G1 (121) respectively. When the bus master device requires control of the common bus, it will activate a request signal to be received over R1/P (111) at the arbiter device (100) including the activated arbitration control circuit (102). The requesting bus master device will then wait for notification of its assignment to the common bus via the grant signal from output G1 (121) of the arbiter device (100) including the activated arbitration control circuit (102). Each bus master device coupled to the common bus (140) is coupled, via arbitration control bus (160) to the arbiter device (100) containing the enabled arbitration control circuit (102) via one of the aforementioned request-grant pairs. It will be understood herein that the connection of the bus master device to the arbiter device (100) comprising the activated arbitration control circuit (102) may be a direct connection thereto, or the connection may pass through another arbiter device (100) associated with the requesting bus master device dependent upon whether the bus master device includes logic for managing its arbitration on the common bus (140).

Figure 2:
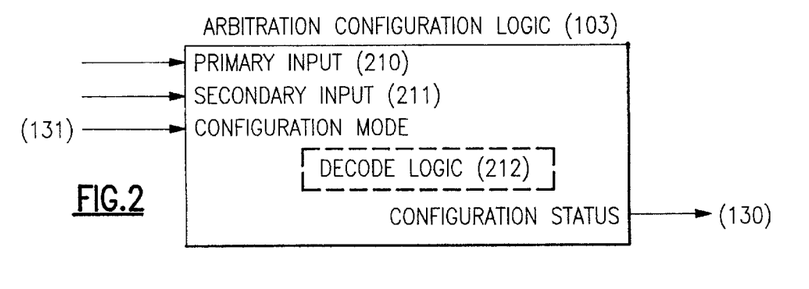
FIG. 2 illustrates a block diagram of an exemplary arbitration configuration logic circuit as may be implemented in the arbiter device.

The arbiter device (100) further includes arbitration configuration circuitry (103) which is shown in greater detail in FIG. 2. The arbitration configuration circuitry (103) includes inputs designated as a primary input (210), a secondary input (211) and a configuration mode input (131), and a number of configuration status outputs designated by the single line (130). The arbitration configuration circuit (103) includes decode logic (212) for decoding the primary input (210) and the secondary input (211) when activated by a configuration mode signal at the configuration mode input (131). The decode logic (212) generates configuration status signals (130) at configuration status outputs (130) which are received by the arbitration control circuit (102) and the arbitration protocol translation logic (101). The configuration status signals determine whether any other devices (i.e. bus master devices or other arbiter devices coupled to bus master devices) requiring arbitration to the common bus (140) are coupled to the arbitration control bus (160), and if so, whether the arbitration control circuit (102) on the particular arbiter device (100) is to be activated to perform the arbitration of the common bus (140).

The primary input (210) of the arbitration configuration circuit (103) is coupled to a request line from the arbitration control bus (160) connecting to an input (for example R1/P (111)) of the arbitration control circuit (102). Likewise, the secondary input (211) is coupled to a request line from the arbitration control bus connecting to an input (for example R2/S (112)) of the arbitration control circuit (102). Additionally, the configuration mode input (131) is a shared input coupling to both the arbitration control circuit (102) and the arbitration configuration circuit (103) from a pre-existing input on the arbiter device (100). Thus, since the arbitration configuration circuit (103) shares inputs from the arbitration control bus (160) with the arbitration control circuit (102) and other inputs, and does not produce signals that are to be transmitted external to the device it is not necessary to add I/O to the arbiter device (100) to operate the arbitration configuration circuit (103).

The signal for the configuration mode input (131) is generated external to the device and is provided to the arbiter device (100) over a pre-existing input. In a preferred embodiment of the invention, a reset input for a processor serving as an exemplary bus master device associated with the arbiter device (100) is utilized. In such an embodiment, the configuration mode may be activated when the reset signal toggles to an active state. The use of the reset line is intended as an exemplary implementation, however those skilled in the art will recognize that other inputs signals, or a combination thereof, such as one of the additional arbitration support signal inputs (150) may be utilized in a like manner.

The operation of the exemplary arbiter device (100) is dependent upon the state of the configuration mode signal (131). When the configuration mode signal (131) toggles to an active state, indicating that the arbiter device is in a configuration mode of operation, the arbitration control circuit (102) responds by driving active grant signals on the output lines G1 (121), G2 (122) and G3 (123) to the arbitration control bus (160). The request inputs of arbitration control circuit (102) receive signals from the arbitration control bus (160) from grant outputs on other such devices coupled to the arbiter device (100) through the arbitration control bus (160). The arbitration configuration circuit (103), as previously noted, shares two of these request inputs designated as the primary input (210) and the secondary input (211) and receives the active configuration mode signal via the configuration mode line (131).

Upon receiving the active configuration mode signal, the arbitration configuration circuit (103) initiates the aforementioned decoding of the primary and secondary inputs via decode logic (212) to provide the configuration status signals (130) to the arbitration control circuit (102) and the protocol translation logic (101) thereby determining the operational state of the arbiter device (100) in the arbitration scheme.

When the configuration mode signal over the configuration mode line (131) subsequently toggles to an inactive state, the arbitration control circuit's (102) operation in that arbiter device (100) is dependent upon the configuration status signals (130) that were provided to the arbitration control circuit (102) by the arbitration configuration circuit (103) during the configuration mode of operation. If the arbitration control circuit (102) had received configuration status signals (130) indicating that multiple devices are coupled to the arbitration control bus requiring arbitration, and that the arbitration control logic circuit (102) is to be enabled or activated to perform the arbitration, the arbiter device (100) subsequently functions, as previously noted, by receiving requests from other bus master devices or arbiter devices over the request inputs R1/P (111), R2/S (112), and R3 (113). The grant outputs in response to these received requests are generated over G1 (121), G2 (122) and G3 (123) respectively. Additionally, the arbitration control logic circuit (102) receives requests for control of the common bus (140) and issues grant responses to the protocol translation logic circuit (101) for its own associated bus master device via the Request 0 (110) and Grant 0 (120) lines respectively. Additionally, as will be subsequently explored in detail, the protocol translation logic circuit (101) coupled to the arbitration configuration logic (103) via the configuration status lines (130) and its operation is likewise affected by the current configuration state of the arbiter device (100).

Alternatively, if the arbitration control circuit (102) had received configuration status signals (130) indicating that multiple devices are coupled to the arbitration control bus (160) requiring arbitration, but that the arbitration control logic circuit (102) is not to perform the arbitration (i.e. arbitration is not activated on the particular arbiter device), the arbitration control logic circuit (102) is configured to function in the arbitration mode of operation, such that request signals received on input lines R1/P (111) and R3 (113) are ignored. The arbitration control logic circuit (102) in this configuration, functions as an I/O path for the protocol translation logic (101) from the associated bus master device during arbitration operation, permitting the associated bus master device to place requests on the arbitration control bus (160), and to receive grant responses therefrom. The receiver for request input R2/S (112) receives the grant output from an active arbitration circuit external to the arbiter device (100) (i.e. from an active arbitration circuit on another arbiter device or bus master device) and internally communicates the grant signal to protocol translation logic (101) via Grant 0 (120). Similarly, the internal request (110) from the protocol translation logic (101) is output from the arbiter device via the output driver associated with G1 (121).

Finally, if the arbitration control logic circuit (102) and the protocol translation logic (101) had received configuration status signals (130) indicating that no other arbiter device or bus master devices are coupled to the arbitration control bus (160), the protocol translation logic (101) is instructed to provide control of the common bus (140) for the associated bus master device without reference to signals from the arbitration control bus (160) and no arbitration control cycles are required for the operation of the bus master device through the arbiter device (100). Furthermore, the arbitration control logic circuit (102) is instructed not to transmit or receive signals over the arbitration control bus (160). The protocol translation logic (101) may be configured to continually provide access to the common bus for the associated mode of operation bus master device.

This single bus master device operation may be accomplished via a variety of different implementations. In a preferred embodiment of the invention, the configuration status signals (130) connecting to the arbitration control logic circuit (102) instruct the arbitration control logic circuit to maintain an active signal from the G0 (120) output received by the protocol translation logic (101). In this manner, the bus master device is effectively "parked" on the common bus (140) and retains continuous control thereof. In another embodiment, one of the configuration status signals (130) which indicates that no other devices are coupled to the arbitration control bus (160) is directly coupled to the protocol translation logic (101) enabling its continuous control of the common bus (140) without reference to the arbitration control logic circuit (102). The particular implementation for the single bus master device implementation is largely dependent upon the protocol P1 of the bus master device and the protocol P2 of the arbitration control bus (160). It will be understood that the invention may be practiced via either of the foregoing embodiments, and as such the illustrated connection of the arbitration configuration circuit (103) to the protocol translation logic (101) may not be required.

Figure 4:
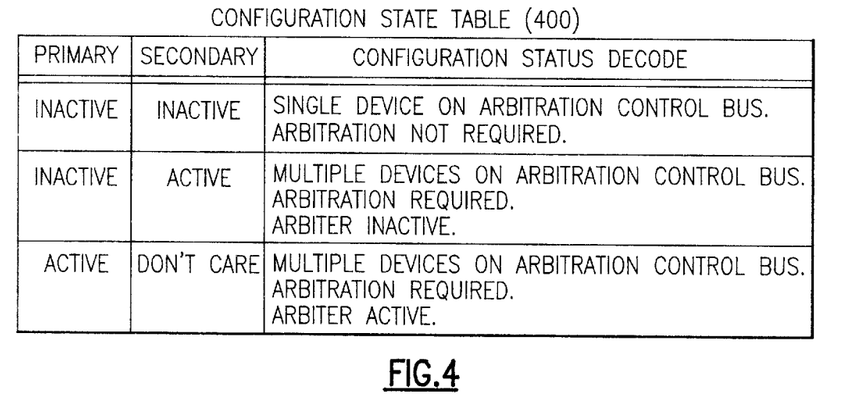
FIG. 4 depicts an embodiment of a configuration state table implemented by decode logic within an exemplary arbitration configuration circuit of the arbiter device.

The state table illustrated in FIG. 4 represents an exemplary decode operation that may be performed by the arbitration configuration logic circuit (103) during the configuration mode operation of the arbiter device (100). The arbitration configuration logic circuit (103) may include any of a variety of decode circuitry (212) to implement this function. Such decode circuits as may be implemented in decode logic (212) are well known to those skilled in the art, and accordingly it is not necessary to elaborate upon a specific implementation of the logic to permit an understanding of the invention. In the exemplary state table, the active or inactive status of the primary input (210) and the secondary input (211) are utilized to decode an arbitration operation state for the particular arbiter device (100).

The decode logic (212) generates configuration status signals (130), which inform the arbiter device (100) whether other arbiter devices or bus master devices requiring arbitration are coupled to the arbitration control bus (160), and which further determines whether the arbitration control circuit (102) on the device will perform the arbitration for control of the common bus (140). Accordingly, the arbitration mode operation of the protocol translation logic (101) and the arbitration control logic circuit (102) are precipitated upon the state of the configuration status signals (130).

In the exemplary state table (400) representing an embodiment of the decode logic (212) for the arbitration configuration logic circuit (103), an active signal received on the primary input (210) while the configuration mode signal (131) is active, produces configuration status signals (130) indicating that multiple devices are coupled to the arbitration control bus (160) requiring arbitration to the common bus (140), and that the arbitration control logic circuit (102) on the arbiter device (100) is to be enabled to perform the arbitration control. An inactive signal on the primary input (210) accompanied by an active signal on the secondary input (211), and an active configuration mode signal (131), produces configuration status signals (130) indicating that multiple devices are coupled to the arbitration control bus (160) requiring arbitration to the common bus (140), but that the arbitration control logic circuit (102) in the arbiter device (100) is not to be enabled to perform the arbitration control. During the arbitration operation mode, the arbitration control logic circuit (102) will serve as I/O through which the bus master device through the protocol translation logic (101) will drive requests R0 (110) through line G1 (121) and receive grant responses from receiver (R2/S) over line (G0) (120) from the arbitration control bus (160). Finally, an inactive signal on both the primary input (210) and the secondary input (211), during the configuration mode of operation results in configuration status signals (130) indicating that no other devices are coupled to the arbitration control bus (160), and consequently that no arbitration control is required for control of the common bus (140). Accordingly, the arbitration control logic circuit (102) is not enabled and does not transmit or receive signals over the arbitration control bus (160), and the bus master may continuously control the common bus (140) without reference to arbitration control cycles.

The protocol translation circuit (101) of the arbiter device (100) illustrated in FIG. 1 operates to render the arbitration protocol P1 of the bus master device compatible with the arbitration protocol P2 of the arbitration control bus (160). A few typical examples of protocol translation are presented for illustrative purposes in FIG. 5 through FIG. 7. In the first illustration, a timing diagram (501) depicts the protocol conversion where the bus master device protocol P1 is a simple token passing protocol and the arbitration protocol P2 of the arbitration control bus (160) is a request-grant arbitration scheme. In a simple token passing arbitration protocol, a bus device can gain access to the common bus (140) only when that device owns the token. Once a bus device which seeks to use the common bus (140) obtains the token, it will retain the token until it has completed its bus access. Conversely, if the bus device does not require access to the common bus (140) or after the bus device has completed accessing the common bus (140) the bus device passes the token onto the next bus device in the line.

Figure 5:
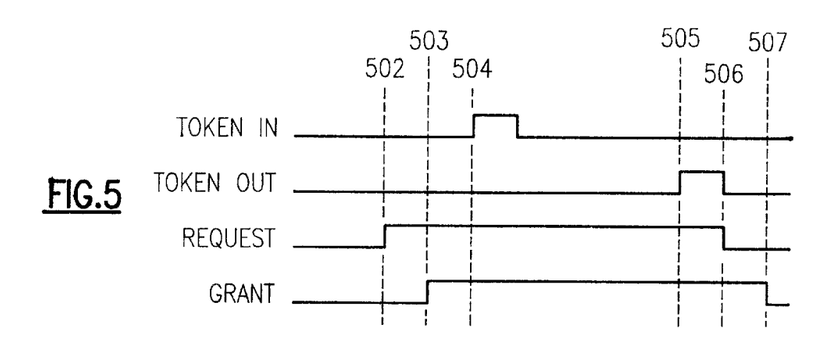
FIG. 5 depicts a timing diagram for arbitration protocol conversion from token passing to request-grant in the arbiter device.

The protocol translation circuit (101) in the arbiter device (100) performs the token passing to request-grant protocol conversion by periodically issuing requests (502) to the arbitration control logic circuit (102) over line R0 (110). When the protocol translation circuit (101) receives a responsive grant signal (503) from the arbitration control logic (102) over line G0 (120), it issues a token (504) to the bus master device associated with the arbiter device (100). The request line R0 (110) remains active thereby ensuring that the grant line G0 (120) from the arbitration control logic unit (102) will remain active for the duration of this request. Thus, this device owns the bus for the duration of the request. Once the bus master device has completed its access of the common bus (140), the token is returned (505) to the protocol translation circuit (104) and the request line R0 (110) and correspondingly, the grant line G0 (120) are deactivated (506 & 507) thereby enabling access by other bus devices.

The period between successive requests made by the protocol translation circuit (101) is variable, and may be set by the designer in accordance with the determination of what type of access to the common bus is appropriate for the particular bus master device. It should be noted that the request interval chosen for the protocol translation logic circuit (101) will affect the overall performance of the common bus (140). If too short an interval is chosen for a particular bus master device, the efficiency of the arbitration scheme will be impacted by causing unnecessary grant cycles for a bus master device that may not need frequent access to the bus, and accordingly these grant cycles will not be available to other bus devices.

Figure 6:
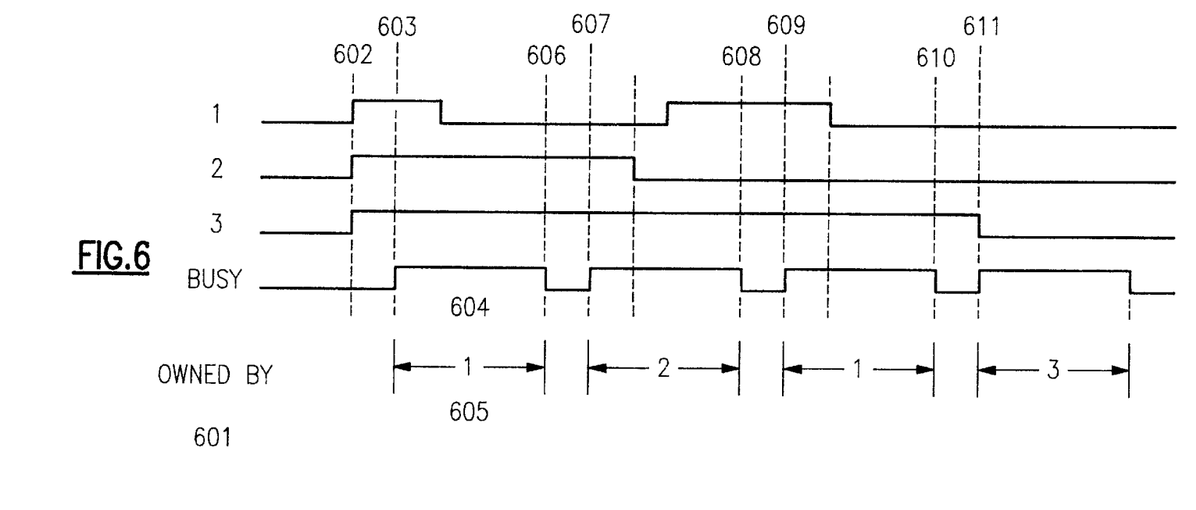
FIG. 6 depicts a timing diagram for an exemplary priority based arbitration scheme implemented among a plurality bus devices.
Figure 7A:
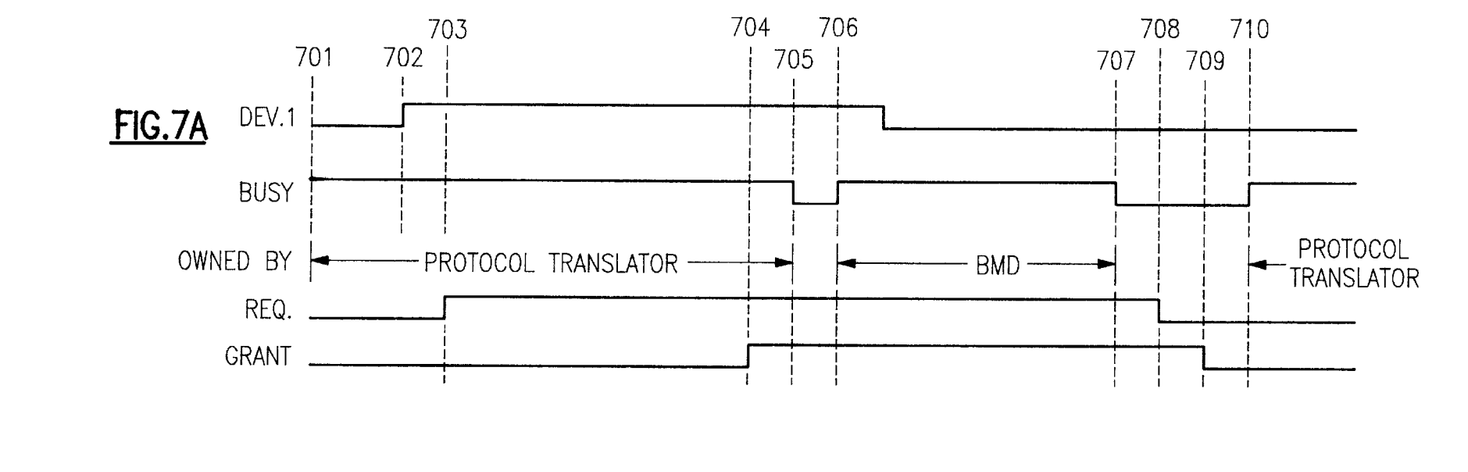
FIG. 7A depicts a timing diagram for the conversion of a priority based arbitration protocol to a request-grant arbitration protocol as may be performed in an embodiment of the arbiter device.
Figure 7B:
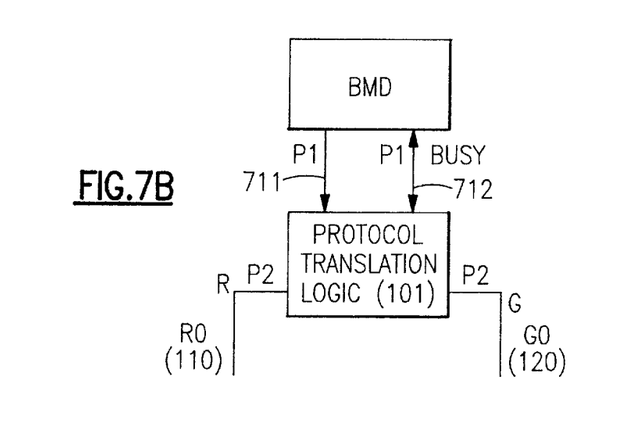
FIG. 7B depicts the communication between the protocol translation logic unit of the arbiter device and an exemplary bus master device for enabling the conversion from a priority based arbitration protocol to a request-grant arbitration protocol.

An additional protocol conversion is further illustrated by the timing diagrams in FIG. 6 and FIG. 7. In this second example, the timing diagrams represent protocol conversion from a bus master device which implements a priority-based arbitration protocol P1 to an arbitration control bus (160) implementing a request-grant arbitration protocol P2. In FIG. 6, an overview of priority based arbitration is shown. In the illustrated example, there are three bus master devices (i.e. Dev. 1, Dev. 2, and Dev. 3) arbitrating for control of the common bus. Dev. 1 is assigned the highest priority and Dev. 3 is assigned the lowest. The bus busy signal line on each of the bus master devices (Dev. 1, Dev. 2, and Dev. 3) is a shared line coupled to each of the devices and is used by each device to indicate that one of these bus master devices is currently accessing the common bus. Thus, from the timing diagram (601) it can be seen that when Dev. 1, Dev. 2 and Dev. 3 all send a request (602) for control of the common bus, access to the common bus is taken by Dev. 1 (603). Accordingly, since Dev. 1 owns the bus, Dev. 2 and Dev. 3 both read a bus busy signal during the time interval (604) which corresponds to the time interval (605) in which the bus is owned by Dev. 1. Likewise, after Dev. 1 has released the common bus (606) the request contention between Dev. 2 and Dev. 3 is resolved in favor of Dev. 2 (607) since it is the higher priority device. After Dev. 2 has relinquished access to the common bus (608) if there exists contention between Dev. 1 and Dev. 3 for access to the common bus, it is resolved in favor of Dev. 1 (609). Finally, after Dev. 1 has relinquished the common bus (610), Dev.3 is granted access to the common bus (611) since there are no other higher priority bus master devices contending for access thereto.

The foregoing simple priority scheme may be implemented in the present invention by controlling the bus busy signal, between each of the bus master devices (i.e. Dev. 1, Dev. 2 and Dev. 3) and the protocol translation logic circuits (101) of their respective arbiter devices (100). For example, in FIG. 7A, the timing diagram for Dev. 1 shows that the device initially receives a busy signal (701) from the protocol translation logic (101). When Dev. 1 seeks to access the common bus (140), it sends a signal to the protocol translation logic circuit (702), which, in turn, sends a request signal (703) over line R0 (110) through the arbitration control circuit (102). Eventually, the grant is returned to the protocol translation circuit (704) via G0 (120) at which point the bus busy signal from the protocol translation circuit (101) associated with Dev. 1 goes inactive (705) allowing Dev. 1 to control the bus (706). Accordingly, the protocol translation circuits associated with Dev. 2 and Dev. 3 (not shown) each will maintain bus busy signals to Dev. 2 and Dev. 3 respectively, indicating that they do not currently have control of the common bus. Subsequently, when Dev. 1 has completed its interaction with the common bus, the device releases control of the common bus (707), the request line R0 (110) is toggled low (708) causing the grant line G0 (120) to toggle low (709) and the bus busy signal from the protocol translation circuit to Dev. 1 to toggle high (710). In this manner priority-based bus master devices may be made to interact with a request-grant based common bus.

In FIG. 7B a diagram depicting the communication between the bus master devices and the protocol translation logic (101) is shown. Herein it is seen that the bus master device may request access to the common bus via a signal over line (711). This signal, in turn, causes the protocol translation logic (101) to translate the signal from protocol P1 (priority) to protocol P2 (request-grant) and send the translated request over line R0 (110) to the arbitration control bus (160) via the arbitration control logic unit (102). Pending receipt by the protocol translation logic (101) of the responsive grant signal over line G0 (120), the bus busy line (712) remains high to the bus master device, indicating that the bus master device may not currently control the common bus (140). Other implementations wherein disparate bus device protocols are rendered compatible with the request-grant protocol of the common bus are possible and are contemplated to be within the scope of the present invention.

Figure 8:
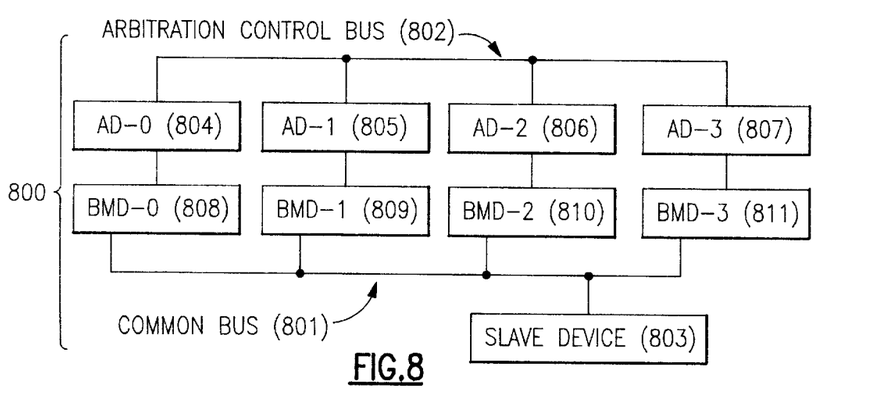
FIG. 8 illustrates a schematic overview of the interconnections among a plurality of exemplary arbiter devices over an arbitration control bus and the connections for the associated bus master devices and a slave device to the common bus.

Referring now to FIG. 8 a block diagram for a bus system (800) implemented utilizing a plurality of arbiter devices (100) (denoted AD-0 through AD-3, numbered elements 804 through 807 respectively) and associated bus master devices BMD-0 through BMD-3 (808–811) respectively, as well as a slave bus device (803) are illustrated. Each of the associated bus master devices are coupled to the common bus (801). The slave device (803) is also connected to the common bus. A typical slave device may be, for example, a read only memory (R0M), or any other device which may send or receive data over the common bus (801), but which does not control communication thereover. Additionally, each of the arbiter devices is coupled to the arbitration control bus (802) for the transmission and receipt of the request, grant and control signals required for arbitration of the common bus (801).

Figure 9:
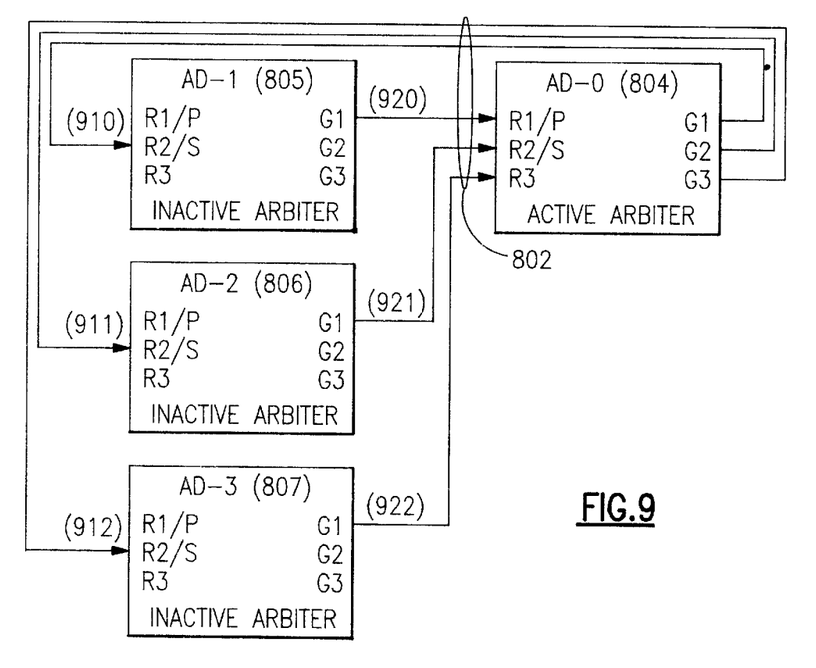
FIG. 9 depicts arbitration control bus connections for an exemplary system comprising a plurality of arbiter devices.

Turning now to FIG. 9, the connections of the four exemplary arbiter devices (AD-0 through AD-3) to the arbitration control bus (802) are depicted in greater detail. In the illustrated system AD-0 (804) is configured to have its arbitration control logic circuit (102) enabled to arbitrate control of the common bus among arbiter devices AD-0 through AD-3. The other arbiter devices ( AD-1 (805), AD-2 (806), and AD-3 (807) ) are each configured such that their respective arbitration control logic circuits (102) do not perform the arbitration. The arbitration control circuit (102) on each of these devices will serve as I/O to the arbitration control bus (802) as previously described. During the arbitration mode of operation, these devices communicate with request-grant pairs on AD-0 (804).

In order to properly configure each arbiter device illustrated in FIG. 9, it is necessary to design the request inputs (111, 112 and 113) on each device to register an inactive signal during the configuration mode of operation, if they are left unconnected. This input design may be accomplished in a variety of ways, including direct connections to an inactive state, or by connection to an inactive level through a resistor. In a preferred embodiment, the R1/P (111), R2/S (112), and R3 (113) inputs for an arbiter device (100) are receivers with built-in resistors coupled to the required inactive level.

When the configuration mode signal (131) is activated, the arbitration control circuits (102) on each arbiter device drive grant outputs G1 (121), G2 (122), and G3 (123) active. Concurrently, the arbitration configuration circuits (103) on each of the arbiter devices begins receiving and decoding (212) the primary input (210) and the secondary input (211).

At each of the devices AD-1 (805), AD-2 (806) and AD-3 (807), the primary inputs (210) (i.e. R1/P) are unconnected, and thus are registered as inactive. The secondary inputs (211) (i.e. R2/P) are driven high via the respective grant outputs G1 (121), G2 (122) and G3 (123) of AD-0 (804). On each of these devices the decode logic (212) in the arbitration configuration circuit (103) implements state table (400), and generates configuration status signals (130) which instruct the arbitration control circuit (102) on each device that other arbiter devices (or similarly configured bus master devices) are coupled to the arbitration control bus (160) necessitating arbitration of the common bus (140). Thus, the bus master devices associated with the arbiter devices AD-0 through AD-3, will utilize arbitration cycles in acquiring access to the common bus (140).

Additionally, the configuration status signals (130) instruct the arbitration control logic circuit (102) on each arbiter device (AD1–AD3) to provide I/O for its associated bus master device, to transmit requests and receive grant responses over the arbitration control bus (160). Accordingly, arbitration control of the common bus is not enabled for the arbitration control circuits (102) on these devices.

During the aforementioned configuration mode of operation, AD-0 (804), receives an active signal at R1/P (111) from the G1 (121) output of AD-1 (805), and an active signal at R2/S (112) from the G1 (121) output of AD-2 (806), and an active signal at R3 (113) from the G1 (121) output of AD-3 (807). Thus, the arbitration configuration circuit (103) on AD-0 (804) receives active signals at the primary input (210) (i.e. R1/P) and at the secondary input (211) (i.e. R2/S). The decode logic (212) on AD-0 (804) implements state table (400) to generate configuration status signals (130) which inform the arbitration control circuit (102) that other devices are coupled to the arbitration control bus (160), and which enable arbitration for control of the common bus (140) to be performed by the arbitration control logic circuit (102).

It will be apparent from the foregoing, that in a system in which a single arbiter device controls the common bus, the device is not coupled to an arbitration control bus (160) because there are no other arbiter devices with which to exchange arbitration signals. Accordingly, the single arbiter device would have its R1/P (111) and R2/S inputs unconnected, and would register inactive signals at the primary (210) and secondary (211) inputs of its arbitration configuration circuit (103) during its configuration mode of operation. The decode logic (212) implementing state table (400) for such an arbiter device (100) would produce configuration status signals (130) indicating to the arbiter device (100) that no other devices are coupled to the arbitration control bus (160), and consequently, that the arbitration control logic circuit (102) is not to be enabled for arbitration control or to transmit or receive signals over the arbitration control bus (160). In response to these configuration status signals (130) the arbiter device will forego any communication over an arbitration control bus (160) using the arbitration control logic circuit (102).

Referring again to FIG. 9, when the configuration mode signal (131) subsequently toggles to an inactive state, the arbiter devices participate in an arbitration operation mode in accordance with the configuration status signals (130) produced during the configuration mode. For example, requests received from AD-1 (805) by AD-0 (804) at R1/P (111) over line (920) elicit grant responses from the activated arbitration control logic circuit (102) on AD-0 (804) driven by G1 (121) over line (910) to the R2/S (112) input on AD-1 (805). Similarly, requests from AD-2 (806) received at the R2/S (112) input of AD-0 (804) over line (921) are responded to by G2 (122) of the AD-0 (804) device over line (911) to the R2/S (112) input on AD-2 (806). Finally, requests from AD-3 (807) received at the R3 (113) input of AD-0 (804) over line (922) produce a grant response at the G3 (123) output of the AD-0 (804) device over line (912) to the R2/S (112) input on AD-3 (807).

Each arbiter device (100) including an inactive arbitration control logic circuit (102) communicates to the arbiter device with the activated arbitration control circuit (102) by sending requests (110) to the arbitration control bus over a G1 (121) output, and by receiving grant responses from the arbiter device with the activated arbitration control circuit (102) over line (120) from request input R2/S (112). Each of these devices is coupled to a request-grant I/O pair on the arbiter device including the enabled arbitration control circuit. The arbiter device (804) including the enabled arbitration control circuit (102) performs the arbitration of the common bus (140) by receiving requests from the other arbiter devices at the request inputs (111, 112, and 113) (as well as from its own associated bus master device over R0 (110)) and responding to the received requests over the paired grant outputs (121, 122 and 123 respectively) (as well as responding to its own bus master device over G0 (120)). It will be understood that additional arbiter devices or similarly configured bus master devices may be included in the exemplary bus system illustrated in FIG. 9 by adding additional request-grant I/O pairs to the device containing the enabled arbitration control logic circuit (102) (i.e. AD-0), and connecting the additional devices to the additional I/O pairs.

Figure 10:
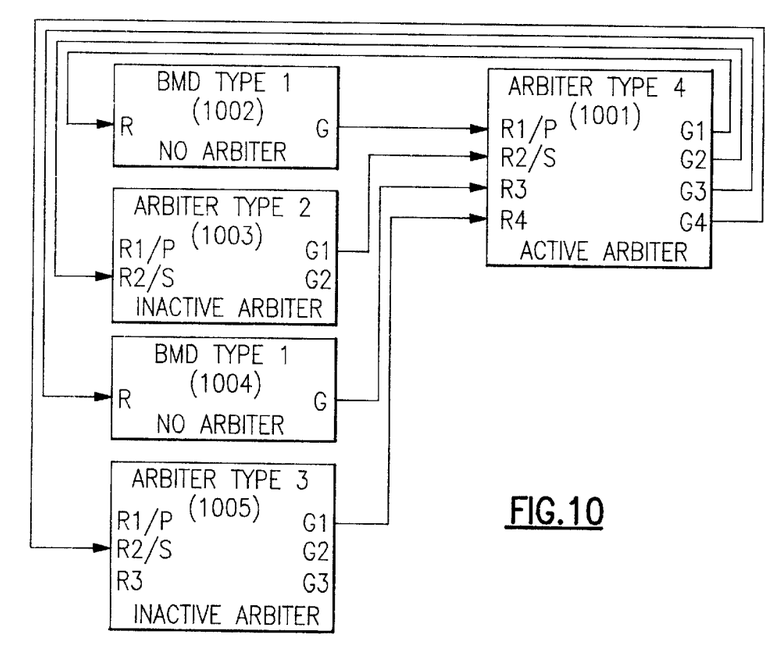
FIG. 10 depicts arbitration control bus connections for an exemplary heterogeneous system comprising arbiter devices including various types of arbitration control circuits and bus master devices without arbitration control circuits.

As an alternative to the embodiment of the invention illustrated in FIG. 9, FIG. 10 illustrates a system including different types of bus master devices and arbiter devices coupled to the arbitration control bus (160). The bus master devices designated type 1 (1002, 1004) contain no arbitration control logic circuitry. These devices include the request and grant connections to the arbitration control bus (160) as well as connections to the common bus (140). In a first embodiment, these devices may not participate in the configuration of the arbitration scheme. In an alternative embodiment, type 1 devices with no arbitration control logic circuitry may be configured to drive their grant outputs high during the configuration mode and consequently, would participate in the configuration of the arbitration scheme.

The type 2 arbiter device (1003) includes arbitration circuitry, and can supply arbitration for up to two external arbiter devices or bus master devices via the two request-grant I/O pairs. The type 3 arbiter device (1005) includes arbitration circuitry, and can supply arbitration for up to three external arbiter devices or bus master devices via the three request-grant I/O pairs. Similarly, the type 4 arbiter device (1001) includes arbitration circuitry which can arbitrate up to four external bus master devices or arbiter devices.

In the illustrated system, the type 4 device (1001) is configured so as to activate its arbitration control circuit (102). When a configuration mode signal (131) is activated, each device drives its grant outputs active. The arbitration configuration circuit (103) on the type 4 device (1001) will receive active signals at its primary (210) and secondary (211) inputs which correspond to R1/P (111) and R2/S (112) respectively. Accordingly, the decode logic (212) for the type 4 device (1001) will generate arbitration status signals (130) which will inform the device that other arbiter devices or bus master devices are coupled to the arbitration control bus (160) and enable the arbitration control circuit (102). The type 2 device (1003) and the type 3 device (1005) will both register inactive signals over their unconnected R1/P inputs (111) corresponding to the primary inputs (210) of their arbitration configuration circuits (103) and active signals over their R2/S inputs (112) corresponding to the secondary inputs (211) thereof.

Accordingly, the decode logic (212) for each of these devices will generate arbitration status signals (130) which will inform these devices that other arbiter devices or bus master devices are coupled to the arbitration control bus, and that the arbitration control circuits (102) included therein are not to be enabled to perform the arbitration.

Once configured in this manner, the arbitration operation of the system illustrated in FIG. 10 proceeds in a manner similar to that previously described for FIG. 9. Thus, a bus system comprising different types of arbiter and bus master devices may be operated in a manner similar to that previously described for operating a system including identical arbiter devices. Accordingly, the present invention enables the arbitration configuration of a heterogeneous bus system including a variety of arbiter and bus master devices.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims.

For example, the exemplary arbiter device has been described as including protocol translation logic, arbitration control circuitry and arbitration configuration circuitry. These circuits were described as separate entities so as to clearly describe the function associated with each circuit. However, it is contemplated that the design of such an arbiter device may be implemented via any combination of circuitry which may achieve the results referred to herein.

The following claims should be construed to maintain the proper protection for the invention first disclosed.

What is claimed is:

1. A packaged semiconductor chip for configuring and performing the arbitration of a common bus, wherein said common bus is capable of being controlled by a bus master component, and wherein said packaged semiconductor chip is capable of being directly coupled to said bus master component, and to an arbitration control bus, and wherein other bus master components may be coupled to said arbitration control bus, said packaged semiconductor chip comprising:

an arbitration protocol conversion logic unit capable of directly coupling to said bus master component for providing a protocol translation interface between said bus master component and said arbitration control bus, said arbitration protocol converts logic unit receiving arbitration control signals for control the common bus from said bus master component, translating said received signals into translated arbitration control signals which are compatible with the protocol of the arbitration control bus and communicating said translated arbitration control signals to the arbitration control bus via an arbitration control logic unit;

said arbitration control logic unit coupled to said arbitration protocol conversion logic unit for receiving said translated arbitration control signals and for communicating said translated arbitration control signals to the arbitration control bus, said arbitration control logic unit capable of being enabled to perform single point arbitration control of said common bus among any of said bus master components coupled to said arbitration control bus, said packaged semiconductor chip including means for coupling said arbitration control logic unit to said arbitration control bus for receiving and transmitting arbitration control signals and for transmitting arbitration configuration signals thereover; and an arbitration configuration logic unit coupled to said arbitration control logic unit for determining whether to enable said arbitration control logic unit to perform single point arbitration control of said common bus, said packaged semiconductor chip including means for coupling said arbitration configuration logic unit to said arbitration control bus for receiving arbitration configuration signal thereover;

wherein said arbitration configuration logic unit is arranged so as not to require separate dedicated input lines on the packaged semiconductor chip.

2. A packaged semiconductor chip according to claim 1 wherein said arbitration configuration logic unit decodes said received arbitration configuration signals to determine whether any of said other bus master components are coupled to said arbitration control bus and to determine whether to enable said arbitration control logic unit to perform single point arbitration control of said common bus.

3. A packaged semiconductor chip according to claim 2 wherein said arbitration configuration logic unit is coupled to said arbitration protocol conversion logic unit for determining whether to instruct said arbitration protocol conversion logic unit to send said translated arbitration control signals to said arbitration control bus.

4. A packaged semiconductor chip according to claim 2 further including means for determining whether said packaged semiconductor chip is to operate in a configuration mode or in an arbitration mode.

5. A packaged semiconductor chip according to claim 4 wherein said arbitration control logic unit receives said operating mode determination from said means for determining whether said packaged semiconductor chip is to operate in said configuration mode or in said arbitration mode.

6. A packaged semiconductor chip according to claim 5 wherein if said arbitration control logic unit receives said determination that said packaged semiconductor chip is to operate in said configuration mode, said arbitration control logic unit will transmit active arbitration configuration signals onto said arbitration control bus.

7. A packaged semiconductor chip according to claim 6 wherein said arbitration configuration logic unit receives said operating mode determination from said means for determining whether said packaged semiconductor chip is to operate in said configuration mode or said arbitration mode.

8. A packaged semiconductor chip according to claim 7 wherein if said arbitration configuration logic unit receives said determination that said packaged semiconductor chip is to operate in said configuration mode, said arbitration configuration logic unit decodes said arbitration configuration signals received from said arbitration control bus to determine whether at least one of said other master components are coupled to said arbitration control bus, and to determine whether to enable single point arbitration control of said common bus by said arbitration control logic unit.

9. A packaged semiconductor chip according to claim 7 wherein if said arbitration control logic unit receives said determination that said packaged semiconductor chip is to operate in said arbitration mode and if said arbitration configuration logic unit determines that any of said other bus master components are coupled to said arbitration control bus, said arbitration control logic unit is configured to transmit and receive arbitration control signals over said arbitration control bus.

10. A packaged semiconductor chip according to claim 9 wherein if said arbitration control logic unit receives said determination that said packaged semiconductor chip is to operate in said arbitration mode and if said arbitration configuration logic unit determines that at least one of said other bus master components are coupled to said arbitration control bus, said bus master component directly coupled to said packaged semiconductor device may control said common bus via participation in the arbitration of said common bus.

11. A packaged semiconductor chip according to claim 10 wherein if said arbitration configuration logic unit further determines that said arbitration control logic unit is to be enabled to provide single point arbitration control of said common bus, said arbitration control logic unit receives said translated arbitration control signals from said arbitration protocol conversion logic unit and receives request signals from said other bus master components coupled to said arbitration control bus, and transmits grant response signals to said arbitration protocol conversion logic unit and to said other bus master components coupled to said arbitration control bus.

12. A packaged semiconductor chip according to claim 11 wherein if said directly coupled bus master component seeks to control said common bus, said directly coupled bus master component sends arbitration control signals through said arbitration protocol conversion logic unit to said arbitration control logic unit, and wherein prior to assuming control of said common bus, said directly coupled bus master logic component receive said grant response signals from said arbitration control logic unit via said arbitration protocol conversion logic unit.

13. A packaged semiconductor chip according to claim 12 wherein said directly coupled bus master component transmits arbitration control signals to said arbitration protocol conversion logic unit and said arbitration protocol conversion logic unit translates the transmitted signals into said translated arbitration control signals for said arbitration control logic unit.

14. A packaged semiconductor chip according to claim 12 wherein said arbitration protocol conversion logic unit translates said grant response signal received from said arbitration control logic unit into a translated arbitration grant signal compatible with the arbitration protocol of the directly coupled bus master component and transmits said translated arbitration grant signal to said directly coupled bus master component.

15. A packaged semiconductor chip according to claim 10 wherein if said arbitration configuration logic unit further determines that said arbitration control logic unit should not be enabled to provide single point arbitration control of said common bus, said arbitration control logic unit receives grant response signals from at least one of said others bus master components coupled to said arbitration control bus, and transmits request signals to at least one said other bus master components coupled to said arbitration control bus.

16. A packaged semiconductor chip according to claim 15 wherein if said directly coupled bus master component seeks to control said common bus, said directly coupled master component sends an arbitration control signal through said arbitration protocol conversion logic unit to said arbitration control logic unit for transmission over said arbitration control bus through said arbitration control logic unit, and wherein prior to assuming control of said common bus said directly coupled bus master component must receive said grant response signal from said arbitration control bus successively through said arbitration control logic unit and said arbitration protocol conversion logic unit.

17. A packaged semiconductor chip according to claim 5 wherein if said arbitration control logic unit receives said determination that said packaged semiconductor chip is to operate in said arbitration mode and if said arbitration configuration logic unit determines that none of said other bus master components are coupled to said arbitration control bus, said arbitration control logic unit does not transmit and receive said arbitration control signals over said arbitration control bus.

18. A packaged semiconductor chip according to claim 5 wherein if said arbitration control logic unit receives said determination that said packaged semiconductor chip is to operate in said arbitration mode and if said arbitration configuration logic unit determines that none of said other bus master components are coupled to said arbitration control bus, said directly coupled bus master component is permitted to control said common bus without participating in the arbitration of said common bus.

19. A packaged semiconductor chip according to claim 5 wherein said means for coupling said arbitration control logic unit to said arbitration control bus include arbitration control bus request inputs and arbitration control bus grant outputs, said arbitration control bus request inputs and said arbitration control bus grant outputs affixed to said packaged semiconductor chip and capable of forming a conductive path from said arbitration control bus to said arbitration control logic unit.

20. A packaged semiconductor chip according to claim 19 wherein said means for coupling said arbitration configuration logic unit to said arbitration control bus include a plurality of said arbitration control bus request inputs, said arbitration configuration logic unit sharing said plurality of arbitration control bus request inputs with said arbitration control logic unit.

21. A packaged semiconductor chip according to claim 20 wherein a first input from said plurality of shared arbitration control bus request inputs is a primary input and a second input from said plurality of shared arbitration control bus request inputs is a secondary input, said arbitration configuration signals being received by said arbitration configuration logic unit via said primary and secondary inputs.

22. A packaged semiconductor chip according to claim 21 wherein said primary and secondary inputs are configured to register an inactive state if they are not coupled to said arbitration control bus.

23. A packaged semiconductor chip according to claim 21 wherein if said arbitration configuration logic unit receives said determination that said packaged semiconductor chip is to operate in said configuration mode, said arbitration configuration logic unit decodes said arbitration configuration signals received at said primary and secondary inputs to determine whether at least one of said other bus master components are coupled to said arbitration control bus and to determine whether to enable said arbitration control logic unit to provide single point arbitration control of said common bus.

24. A packaged semiconductor chip according to claim 23 wherein if said arbitration configuration logic unit receives an active arbitration configuration signal via said primary input, said arbitration configuration logic unit decodes the active arbitration configuration signal to determine that at least one of said other bus master components are coupled to said arbitration control bus and to enable said arbitration control logic unit to provide single point arbitration control of said common bus.

25. A packaged semiconductor chip according to claim 23 wherein if said arbitration configuration logic unit receives an inactive arbitration configuration signal via said primary input and an active arbitration configuration signal via said secondary input, said arbitration configuration logic unit decodes the received signals to determine that at least one of said other bus master components are coupled to said arbitration control bus and to determine not to enable said arbitration control logic unit to provide single point arbitration control of said common bus.

26. A packaged semiconductor chip according to claim 23 wherein if said arbitration configuration logic unit receives an inactive arbitration configuration signal via said primary input and an inactive arbitration configuration signal via said secondary input, said arbitration configuration logic decodes the received signals to determine that none of said other bus master components are coupled to said arbitration control bus and to determine not to enable said arbitration control logic unit to provide single point arbitration control of said common bus.

27. A packaged semiconductor chip according to claim 23 wherein said arbitration configuration logic unit implements the state table:

| Primary Input | Secondary Input | Bus Master Status |
| --- | --- | --- |
| inactive | inactive | no other bus master components on arbitration control bus; no arbitration of common bus required. |
| inactive | active | other bus master components on arbitration control bus; arbitration control logic unit not enabled |
| active | don't care | other bus master components on arbitration control bus; arbitration control logic unit - enabled | to decode said arbitration configuration signals received on said primary and secondary inputs.

28. In a packaged semiconductor chip, a method for configuring and performing arbitration for a common bus, said common bus capable of being controlled by a bus master component which may be directly coupled to the packaged semiconductor chip, wherein said packaged semiconductor chip may further be coupled to an arbitration control bus, and said arbitration control bus may be coupled to other bus master components, and wherein said packaged semiconductor chip includes an arbitration protocol conversion logic unit coupled to said directly coupled bus master component for providing a protocol translation interface between said directly coupled bus master component and said arbitration control bus, an arbitration control logic unit coupled to said arbitration protocol conversion logic unit and to said arbitration control bus for transmitting and receiving arbitration control signals thereover, and an arbitration configuration logic unit coupled to said arbitration control logic unit and to said arbitration control bus, said method comprising the steps of:

receiving and decoding said arbitration configuration signals from said arbitration control bus at said arbitration configuration logic unit;

determining via said decoded arbitration configuration logic signals whether to enable said arbitration control logic unit to provide single point arbitration control of said common bus;

receiving arbitration control signals from said directly coupled bus master component at said arbitration protocol conversion logic unit, and translating said received arbitration control signals to the protocol of the arbitration control bus;

receiving at said arbitration control logic unit said translated arbitration control signals;

wherein said arbitration configuration logic unit is arranged so as not to require separate dedicated input lines on the packaged semiconductor chip.

29. A method according to claim 28 wherein said decoding of said arbitration configuration signals permits the determination of whether at least one of said other bus master components are coupled to said arbitration control bus.

30. A method according to claim 29 further including the step of determining whether said packaged semiconductor chip is to operate in a configuration mode or in an arbitration mode.

31. A method according to claim 30 wherein said arbitration configuration logic unit receives said determination of whether said packaged semiconductor chip is to operate in said configuration mode or in said arbitration mode.

32. A method according to claim 31 wherein if said arbitration configuration logic unit receives said determination that said packaged semiconductor chip is to operate in said configuration mode, said arbitration configuration logic unit decodes said arbitration configuration signals received from said arbitration control bus to determine whether at least one of said other bus master components are coupled to said arbitration control bus, and to determine whether to enable said arbitration control logic unit to perform single point arbitration control of said common bus.

33. A method according to claim 31 wherein if said arbitration control logic unit receives said determination that said packaged semiconductor chip is to operate in said arbitration mode and if said arbitration configuration logic unit determines that at least one of said other bus master components are coupled to said arbitration control bus, said arbitration control logic unit transmits and receives arbitration control signals over said arbitration control bus.

34. A method according to claim 31 wherein if said arbitration control logic unit receives said determination that said packaged semiconductor chip is to operate in said arbitration mode and if said arbitration configuration logic unit determines that at least one of said bus master components are coupled to said arbitration control bus, said directly coupled bus master component may control said common bus by participating in arbitration of said common bus.

35. A method according to claim 34 wherein if said arbitration configuration logic unit further determines that said arbitration control logic unit is to be enabled to provide single point arbitration control of said common bus, said arbitration control logic unit receives said translated arbitration control signals from said arbitration protocol conversion logic unit and receives request signals from said other bus master components coupled to said arbitration control bus, and transmits grant response signals to said arbitration protocol conversion logic unit and to said other bus master components coupled to said arbitration control bus.

36. A method according to claim 35 wherein if said directly coupled bus master component seeks to control said common bus, said directly coupled bus master component sends request signals to said arbitration control logic unit, and wherein prior to assuming control of said common bus, said directly coupled bus master component must receive said grant response from said arbitration control logic unit via said arbitration protocol conversion logic unit.

37. A method according to claim 36 wherein said directly coupled bus master component transmits arbitration control signals to said arbitration protocol conversion logic unit and said arbitration protocol conversion logic unit translates the transmitted signals into said translated arbitration control signals for said arbitration control logic unit.

38. A method according to claim 36 wherein said arbitration protocol conversion logic unit translates said grant response signal received from said arbitration control logic unit into a translated arbitration grant signal compatible with the arbitration protocol of the directly coupled bus master component, and transmits said translated arbitration grant signal to said directly coupled bus master component.

39. A method according to claim 34 wherein if said arbitration configuration logic unit further determines that said arbitration control logic unit should not be enabled to provide single point arbitration control of said common bus, said arbitration control logic unit receives grant response signals from at least one of said other bus master components coupled to said arbitration control bus, and transmits request signals to at least one of said other bus master components coupled to said arbitration control bus.

40. A method according to claim 39 wherein if said directly coupled bus master component seeks to control said common bus, said directly coupled bus master component sends an arbitration control signal through said arbitration protocol conversion logic unit for transmission over said arbitration control bus through said arbitration control logic unit, and wherein prior to assuming control of said common bus, said directly coupled bus master component must receive said grant response signal from said arbitration control logic unit through said arbitration protocol conversion logic unit.

41. A method according to claim 29 wherein said arbitration control logic unit receives said determination of whether said packaged semiconductor chip is to operate in said configuration mode or in said arbitration mode.

42. A method according to claim 41 wherein if said arbitration control logic unit receives said determination that said packaged semiconductor chip is to operate in said configuration mode, said arbitration control logic unit transmits active arbitration configuration signals onto said arbitration control bus.

43. A method according to claim 41 wherein if said arbitration control logic unit receives said determination that said packaged semiconductor chip is to operate in said arbitration mode and if said arbitration configuration logic unit determines that none of said other bus master components are coupled to said arbitration control bus, said arbitration control logic unit does not transmit and receive said arbitration control signals over said arbitration control bus.

44. A method according to claim 41 wherein if said arbitration control logic unit receives said determination that said packaged semiconductor chip is to operate in said arbitration mode and if said arbitration configuration logic unit determines that none of said other bus master components are coupled to said arbitration control bus, said directly coupled bus master component is permitted to control said common bus without participating in the arbitration of said common bus.

45. A method according to claim 41 wherein said arbitration control logic unit is coupled to said arbitration control bus via arbitration control bus request inputs and arbitration control bus grant outputs, said arbitration control bus request inputs and arbitration control bus grant outputs affixed to said packaged semiconductor component and capable of forming a conductive path from said arbitration control bus to said arbitration control logic unit.

46. A method according to claim 45 wherein said arbitration configuration logic unit is coupled to said arbitration control bus by a plurality of said arbitration control bus request inputs, said arbitration configuration logic unit sharing said plurality of arbitration control bus request inputs with said arbitration control logic unit.

47. A method according to claim 46 wherein a first input of said plurality of shared arbitration control bus request inputs is a primary input and a second input of said plurality of shared arbitration control bus request inputs is a secondary input, said arbitration configuration signals being received by said arbitration configuration logic unit via said primary and secondary inputs.

48. A method according to claim 47 wherein said primary and secondary inputs are configured to register an inactive state if they are not coupled to said arbitration control bus.

49. A method according to claim 47 wherein if said arbitration configuration logic unit receives said determination that said packaged semiconductor chip is to operate in said configuration mode, said arbitration configuration logic unit decodes said arbitration configuration signals received at said primary and secondary inputs to determine whether at least one of said other bus master components are coupled to said arbitration control bus, and to determine whether to enable said arbitration control logic unit to provide single point arbitration of said common bus.

50. A method according to claim 49 wherein if said arbitration configuration logic unit receives an active arbitration configuration signal via said primary input, said arbitration configuration logic unit decodes the active arbitration configuration signal to determine that at least one of said other bus master components are coupled to said arbitration control bus and to enable said arbitration control logic unit to provide single point arbitration of said common bus.

51. A method according to claim 49 wherein if said arbitration configuration logic receives an inactive arbitration configuration signal via said primary input and an active arbitration configuration signal via said secondary input, said arbitration configuration logic unit decodes the received signals to determine that at least one of said other bus master components are coupled to said arbitration control bus and to determine not to enable said arbitration control logic unit to provide single point arbitration of said common bus.

52. A method according to claim 49 wherein if said arbitration configuration logic unit receives an inactive arbitration configuration signal via said primary input and an inactive arbitration configuration signal via said secondary input, said arbitration configuration logic unit decodes the received signals to determine that none of said other bus master components are coupled to said arbitration control bus and to determine not to enable said arbitration control logic unit to provide single point arbitration of said common bus.

53. The method according to claim 49 wherein said arbitration configuration logic unit implements the state table:

| Primary Input | Secondary Input | Bus Master Status |
|---|---|---|
| inactive | inactive | no other bus master components on arbitration control bus; no arbitration of common bus required. |
| inactive | active | other bus master components on arbitration control bus; arbitration control logic unit not enabled |
| active | don't care | other bus master components on arbitration control bus; arbitration control logic unit enabled | to decode said arbitration configuration signals received on said primary and secondary inputs.

* * * * *